Jan. 16, 1940.   L. A. MOREAU   2,187,533
MOTOR VEHICLE JACK
Filed Sept. 1, 1939   2 Sheets—Sheet 1
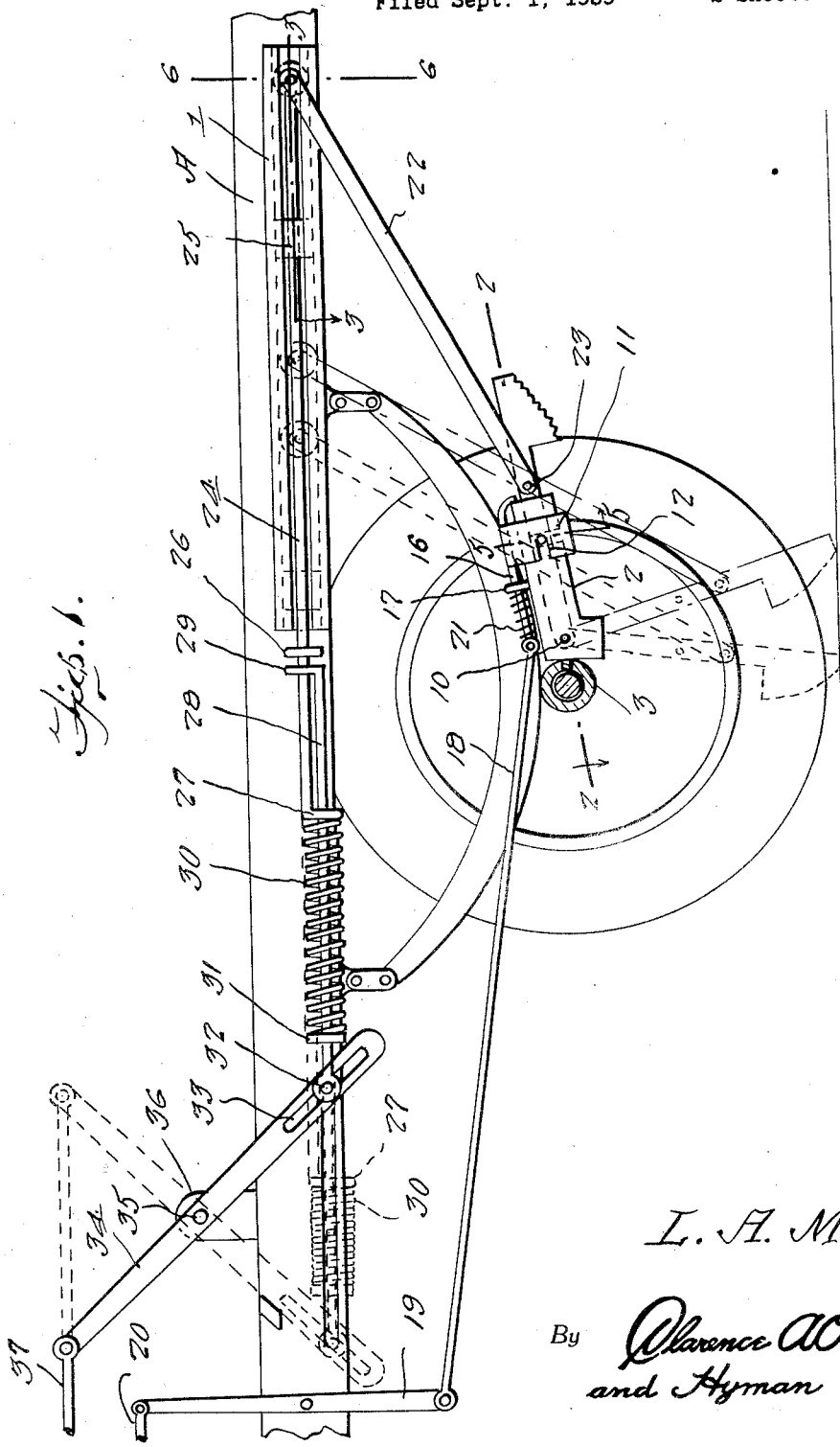
Inventor
*L. A. Moreau*
By *Clarence A. O'Brien*
and *Hyman Berman*
Attorneys Jan. 16, 1940.    L. A. MOREAU    2,187,533
MOTOR VEHICLE JACK
Filed Sept. 1, 1939    2 Sheets-Sheet 2
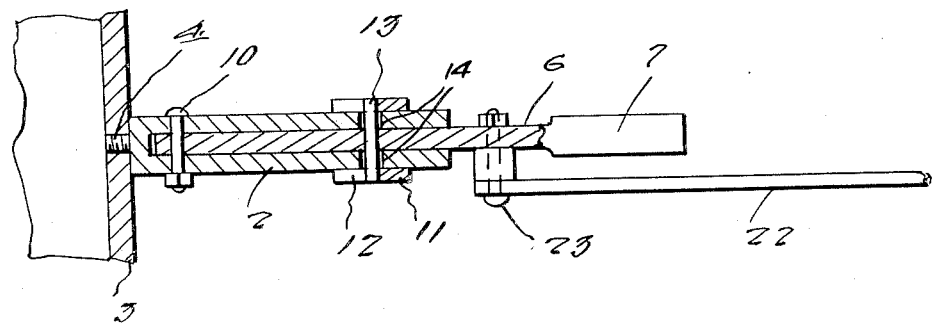
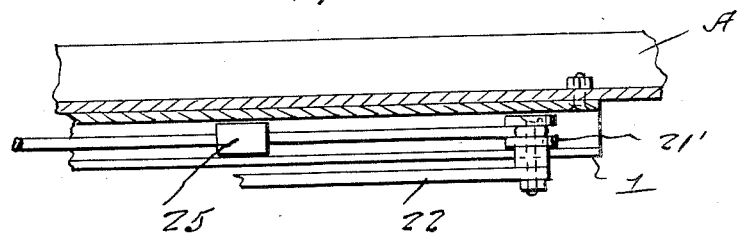
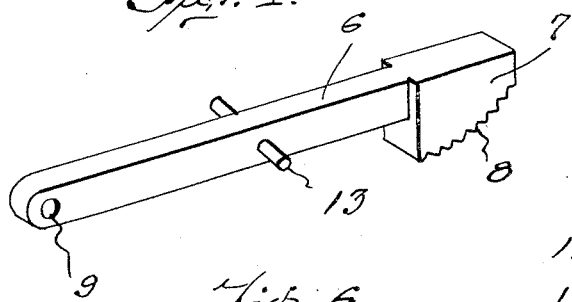
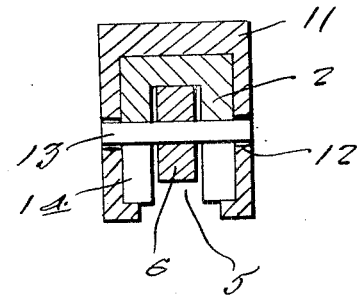
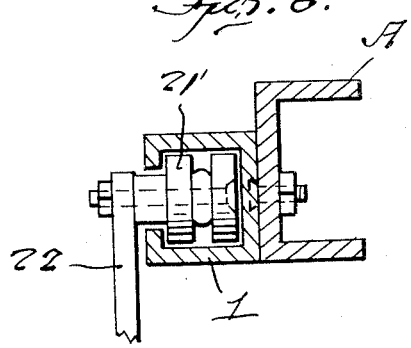
Inventor
L. A. Moreau
By Clarence A. O'Brien
and Hyman Berman
Attorneys Patented Jan. 16, 1940

2,187,533

UNITED STATES PATENT OFFICE 2,187,533

MOTOR VEHICLE JACK

Leo Arthur Moreau, North Adams, Mass.

Application September 1, 1939, Serial No. 293,144

3 Claims. (Cl. 254—86)

This invention relates to a motor vehicle jack, the general object of the invention being to provide means whereby the jack can be dropped by a manually operated member located adjacent the driver's seat after which by moving the vehicle the jack will be caused to raise the wheel off the ground, with means whereby the jack can be raised by another manually operated member associated with spring means which facilities the raising of the jack.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a fragmentary elevation of part of a vehicle showing the invention applied thereto.

Figure 2 is a section on the line 2—2 of Figure 1.

Figure 3 is a section on the line 3—3 of Figure 1.

Figure 4 is a perspective view of the jack member.

Figure 5 is a section on the line 5—5 of Figure 1.

Figure 6 is a section on the line 6—6 of Figure 1.

In these views the letter A indicates a side member of the chassis frame of the vehicle and the numeral 1 indicates a longitudinally extending channel-shaped track member attached to a part of the member A adjacent a wheel of the vehicle with which the jack is to be associated. A small housing 2 is fastened to an axle part 3 of the vehicle by a threaded part 4 engaging a threaded hole in said part 3, as shown more particularly in Figure 2, this housing having a major portion extending upwardly and outwardly from the axle and a short part extending downwardly as clearly shown in Figure 1 with the bottom and inner edge of the two parts of the housing open as shown at 5 in Figure 5. The jack member includes an elongated shank 6 having a head 7 at one end thereof which has one face sloping and provided with teeth 8. The other end of the shank has a hole 9 therein which receives a pivot pin 10 which passes through the housing 2 at the junction of the two parts thereof, as shown in Figure 1. Thus when the jack member is in raised position it will extend through the large part of the housing 2 and projects from the rear end thereof but when in vertical position the shank will extend through the small depending part of the housing as shown in dotted lines in Figure 1. The jack member is held in raised position as shown in full lines in Figure 1 by a collar 11 slidably arranged on the large part of the housing and having slots in its side part as shown at 12 for receiving the ends of a pin 13 carried by an intermediate part of the shank 6 of the jack member, the pin also engaging a vertical slot 14 in the housing. A bar 16 is connected with the top of the collar 11 and passes through a guide eye 17 on the housing 2 with its front end connected to an operating bar 18 which is connected to a lever 19 pivoted to a part of the member A and connected at its upper end by a bar 20 to an operating lever located near the driver's seat. A spring 21 on the bar 16 holds the parts with the sleeve or collar 11 in its forward position with its slots 12 engaging the pin 13 for holding the jack member in raised position. However, by rocking the lever 19 the bar 18 pushes the bar 16 rearwardly so as to move the collar or sleeve 11 rearwardly on the housing 2 which moves the slots 12 out of engagement with the pin 13 so that the jack member is released and can drop downwardly to the slightly inclined position shown in dotted lines in Figure 1 with a part of its head resting on the road surface.

A wheel assembly 21' is movably arranged in the track member 1 and a link 22 connects this assembly with the shank 6 of the jack member as shown at 23. A rod 24 passes through the track member 1 and has its rear end connected with the trolley assembly 21 and said rod 24 has the guiding blocks 25 thereon. The rod 24 also passes through a guide eye 26 carried by the frame part A and has its front end bent at right angles and provided with the eye 27 through which passes a rod 28 which also has a right angularly extending eye 29 through which the rod 24 passes. A spring 30 is arranged on the rod 28 and has one end bearing against the eye 27 of rod 24 and its other end bears against a stop 31 on the rod 28. Said rod 28 carries a roller carrying projection 32 which engages a slot 33 in the lower end of a lever 34 pivoted at 35 to a bracket 36 on the member A with the upper end of the lever connected by a link 37 to a lever or other operating member adjacent the driver's seat.

Thus when the jack is to be used the operator actuates the lever 19 to release the jack member from the collar 11 so that the jack member can drop into the position shown in dotted lines to the right in Figure 1. And the lever 34 is moved to the dotted line position shown in Figure 1 which places the jack and the associated parts in the first dotted line position shown to the right in Figure 1. Then the vehicle is moved to cause the lower end of the jack member to press against the road surface which results in the jack member lifting the wheel off the ground as shown in dotted lines to the left of Figure 1. This movement of the jack places the tension on the spring 30 as shown in dotted lines in Figure 1. Then when the tire has been repaired or replaced on the wheel or the vehicle is to be lowered by release of the jack, said vehicle is moved forwardly to move the jack to the dotted line position at the right of Figure 1 and as this is being done the spring 30 extends so as to move the parts to raise the jack off the ground and the raising movement is completed by movement of the lever 34. Then the lever 19 is moved to cause the collar 11 to move forwardly into engagement with the pin 13 to hold the jack in raised position.

Having described the invention, what is claimed as new is:

1. A jack for a vehicle comprising a housing having an opening in the bottom, a jack member pivoted in the housing, manually operated means for holding the jack in the housing and releasing the jack when desired, a horizontally arranged track, a wheeled member operated in the track, a link connecting the jack member with the wheeled member, a rod assembly having spring means thereon connected with the wheeled member, a slotted lever connected with the rod assembly and manually operated for raising and lowering the jack.

2. A jack for a vehicle comprising a housing having an opening in the bottom, a jack member pivoted in the housing, manually operated means for holding the jack in the housing and releasing the jack when desired, a horizontally arranged track, a wheeled member operated in the track, a link connecting the jack member with the wheeled member, a rod assembly connected with the wheeled member, said rod assembly including a rod having an eye at its front end, a second rod passing through the eye and having an eye at its rear end through which the first rod passes, a spring on the second rod engaging the eye member of the first rod, a lever having a slot therein, a projection on the second rod engaging the slot and manual means for operating the lever for raising and lowering the jack.

3. A jack for a vehicle comprising a housing, a jack member pivoted in the housing, manually operated means for holding the jack in the housing and releasing the jack when desired, a horizontally arranged track, a headed member operated in the track, a link connecting the jack member with the headed member, a rod assembly connected with the headed member, a lever connected with the rod assembly and manually operated for raising and lowering the jack.

LEO ARTHUR MOREAU.